Aug. 13, 1957     H. A. STORCH     2,802,429
LOADING MECHANISM
Original Filed July 1, 1948     6 Sheets-Sheet 1
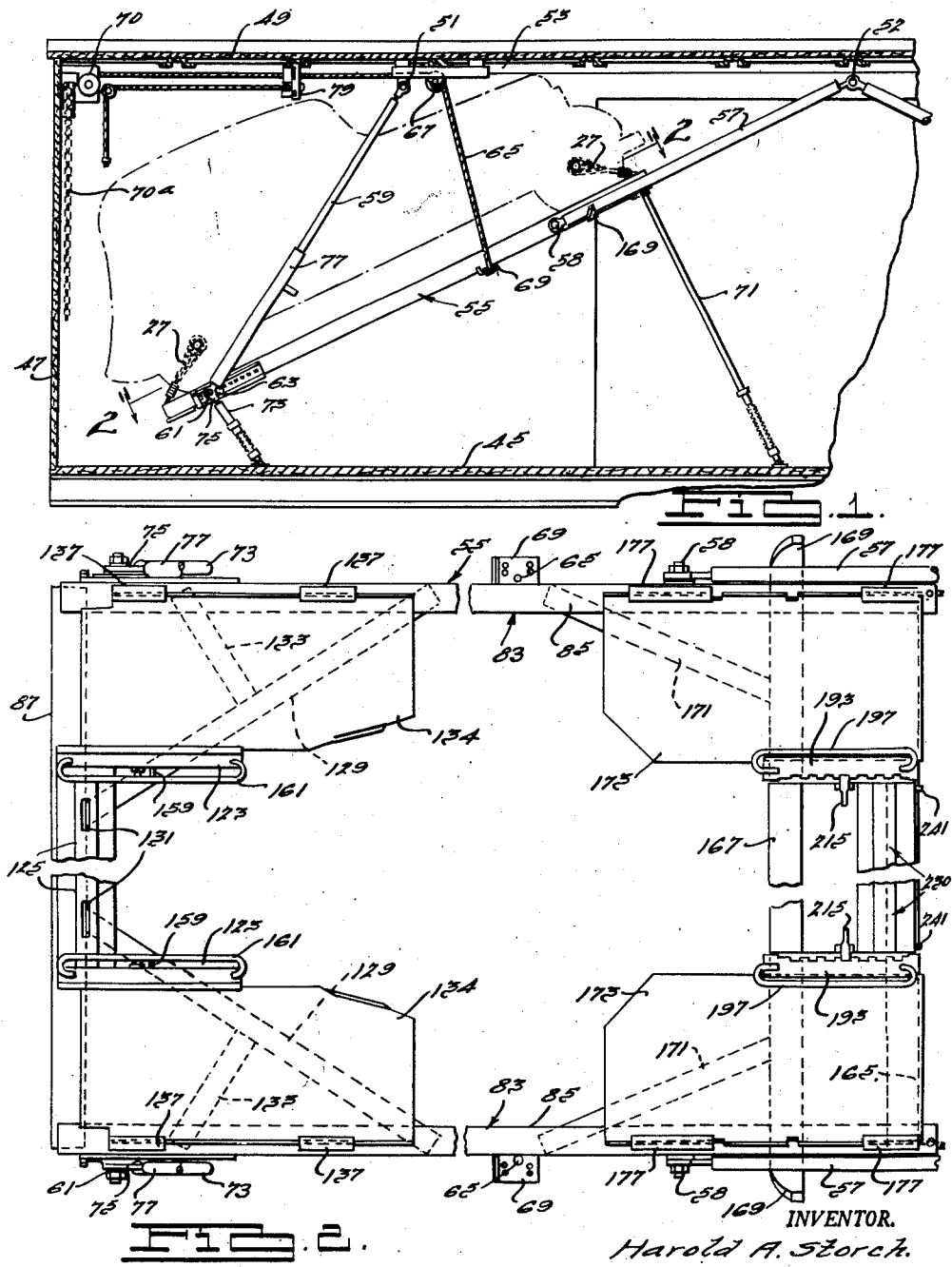
INVENTOR.
Harold A. Storch.
BY
Harness, Dickey & Pierce.
ATTORNEYS.

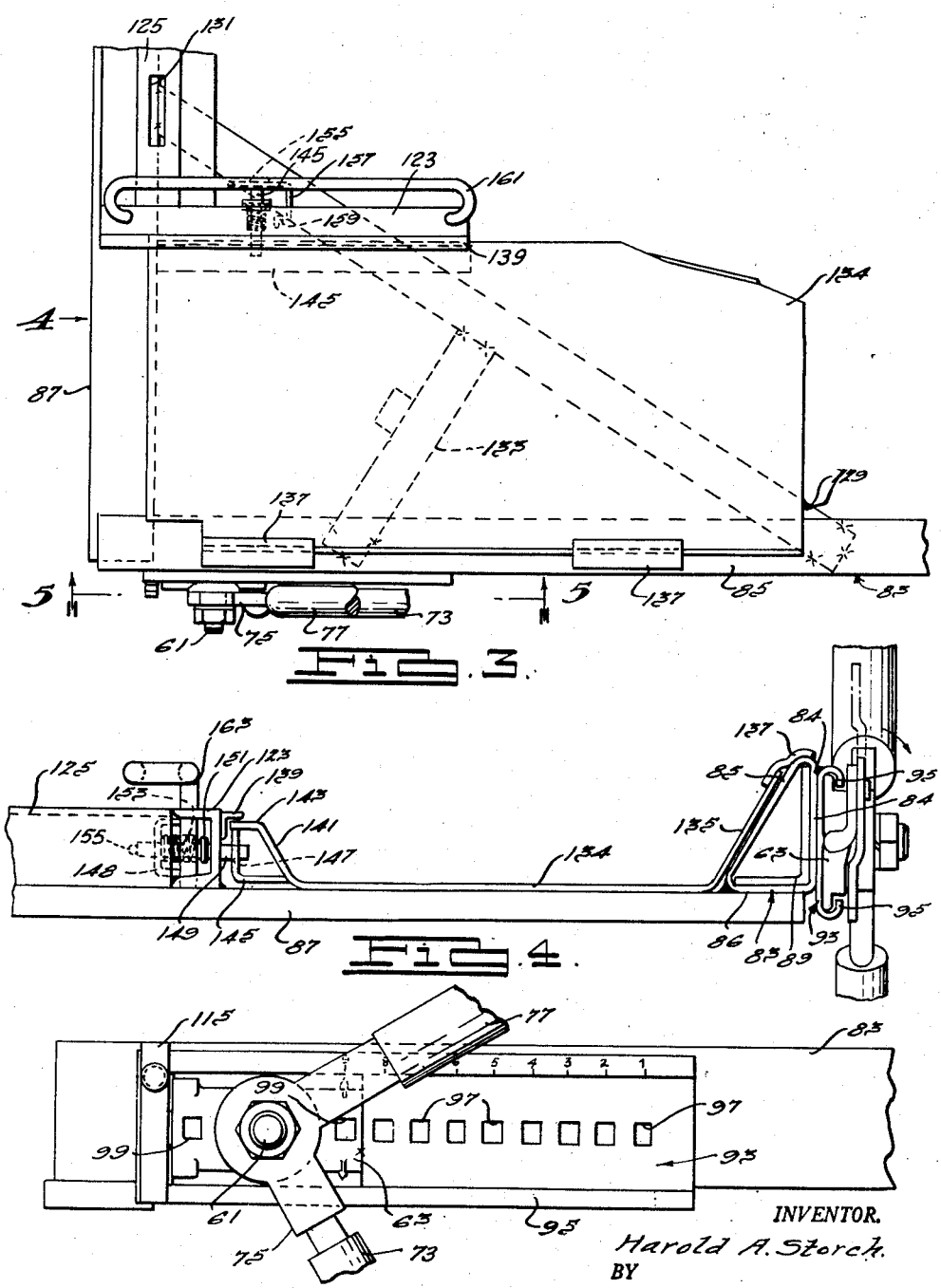

Aug. 13, 1957  H. A. STORCH  2,802,429
LOADING MECHANISM
Original Filed July 1, 1948  6 Sheets-Sheet 3
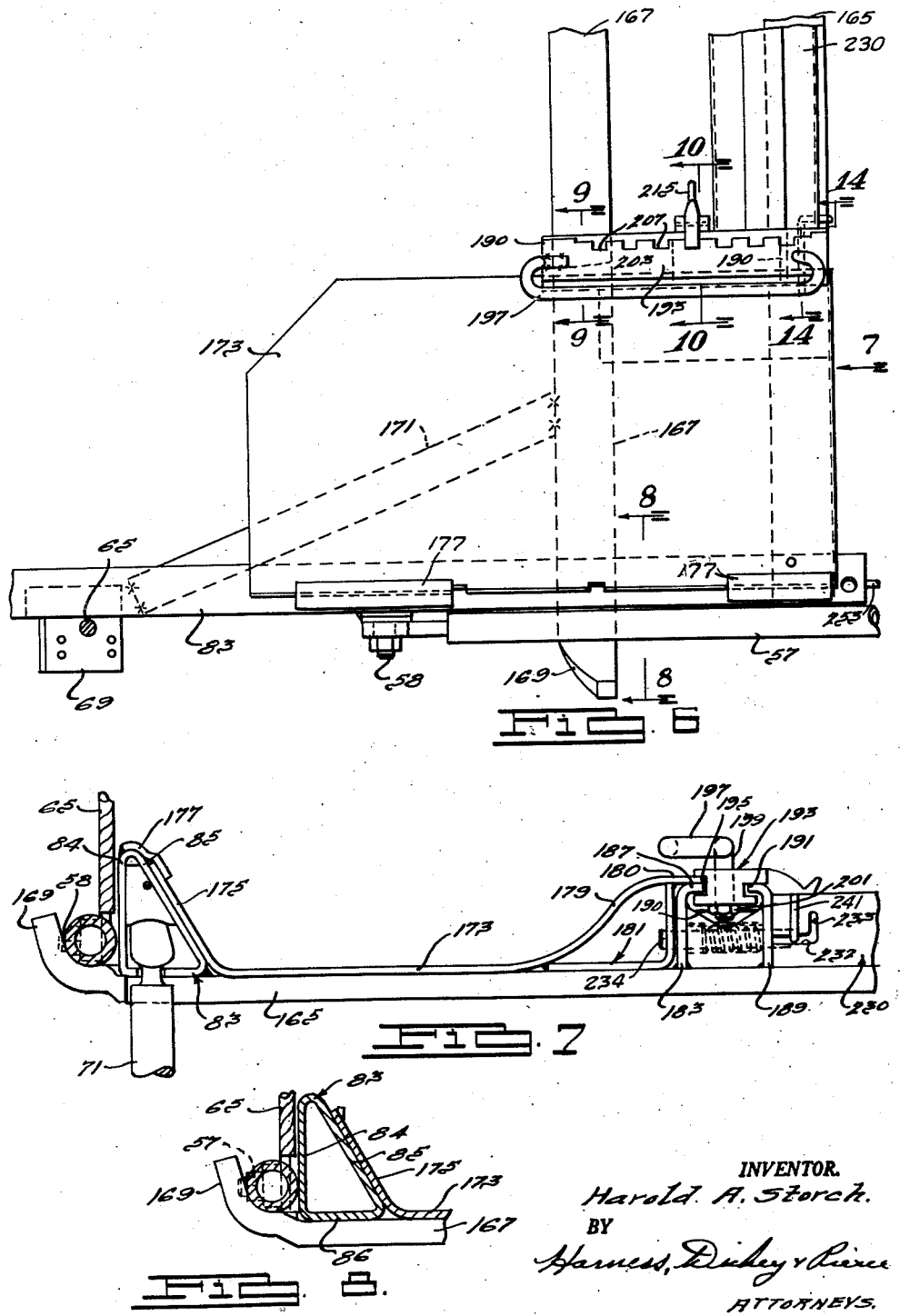
INVENTOR.
Harold A. Storch.
BY
ATTORNEYS.

Aug. 13, 1957   H. A. STORCH   2,802,429
LOADING MECHANISM
Original Filed July 1, 1948   6 Sheets-Sheet 4
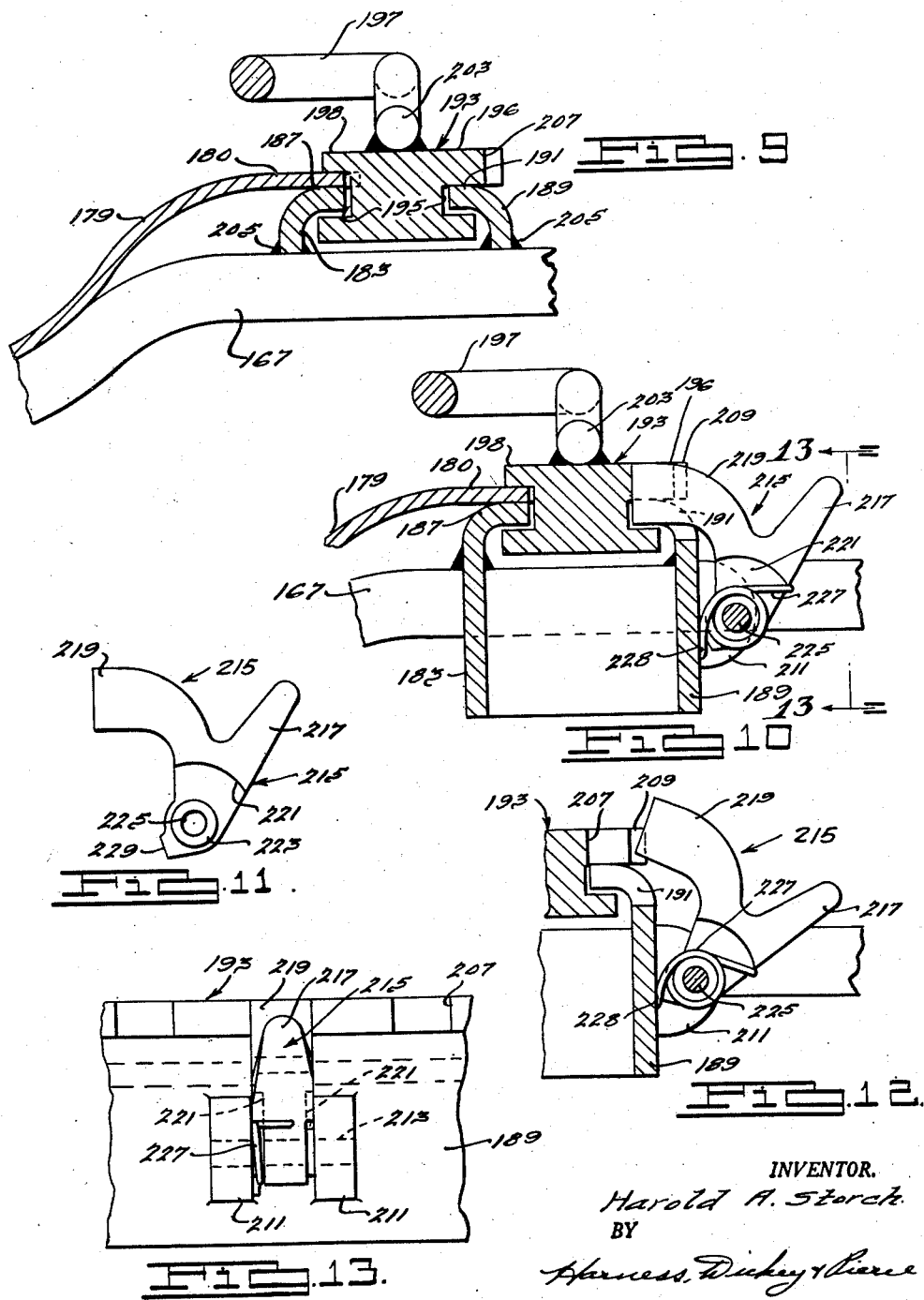

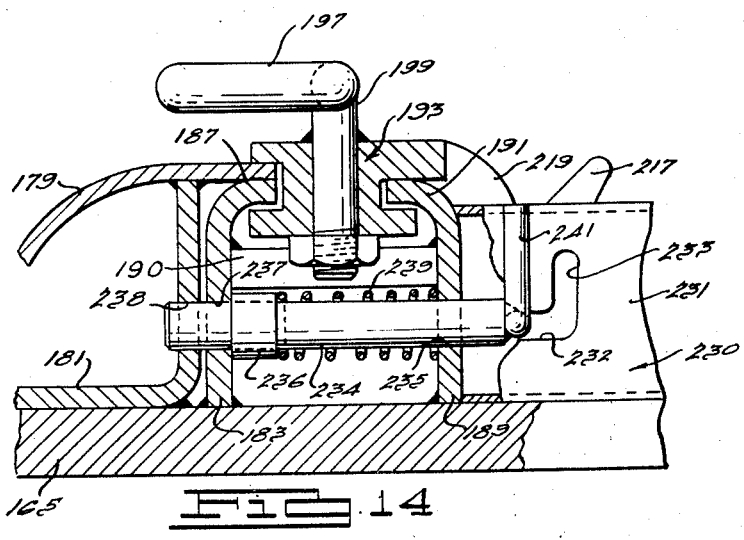

Aug. 13, 1957  H. A. STORCH  2,802,429
LOADING MECHANISM
Original Filed July 1, 1948  6 Sheets-Sheet 6

INVENTOR.
Harold A. Storch.
BY
Harness, Dickey & Pierce
ATTORNEYS.

United States Patent Office 2,802,429
Patented Aug. 13, 1957

2,802,429
LOADING MECHANISM

Harold A. Storch, Birmingham, Mich., assignor to Evans Products Company, Plymouth, Mich., a corporation of Delaware Original application July 1, 1948, Serial No. 36,551, now Patent No. 2,693,153, dated November 2, 1954. Divided and this application October 31, 1952, Serial No. 318,008

9 Claims. (Cl. 105—368)

This invention relates to a car loading device and has particular relation to a mechanism for disposing an automobile in a semidecking position for transportation purposes, the invention being particularly concerned with adjustable wheel pans and frame structure for such devices.

The principal objects of this invention are to provide a new and improved type of automobile loading frame which is light in weight, economical to manufacture, simple in construction and more easily mounted and adapted for use in a freight car; to provide a frame having closed section side rails which will give added strength and rigidity to the frame; to provide a frame having closed section side rails which have sloping sides to guide the wheels of an automobile which is loaded thereon even before it reaches the wheel pan; to provide improved type locks for adjustable wheel pans and chain bars so that the aforementioned adjustable parts can be adjusted by one man; and to provide generally an improved type frame having various improved and novel features thereon.

These and other objects of this invention will become apparent from the following detailed description taken in conjunction with the accompanying drawings in which:

Figure 1 is a side-elevational view of the frame of this invention, shown in a semidecking position within a freight car;

Fig. 2 is a broken plan view of the frame taken along the line 2—2 of Fig. 1;

Fig. 3 is a partial enlarged plan view of a portion of the rear end of the frame structure illustrated in Fig. 2;

Fig. 4 is an end elevational view of the structure illustrated in Fig. 3 taken in the direction of the arrow 4 on Fig. 3;

Fig. 5 is a view in elevation taken along the line 5—5 of Fig. 3;

Fig. 6 is an enlarged partial plan view of a portion of the front end of the frame structure illustrated in Fig. 2;

Fig. 7 is an end elevational view taken in the direction of the arrow 7 on Fig. 6;

Fig. 8 is a sectional view taken along the line 8—8 of Fig. 6;

Fig. 9 is a sectional view taken along the line 9—9 of Fig. 6;

Fig. 10 is a sectional view taken along the line 10—10 of Fig. 6;

Fig. 11 is a side-elevational view of a detail of the lock mechanism shown in Fig. 10;

Fig. 12 is a partial sectional view of the structure illustrated in Fig. 10, showing the mechanism in an unlocked position;

Fig. 13 is an elevational view taken along the line 13—13 of Fig. 10;

Fig. 14 is an enlarged sectional view taken along the line 14—14 of Fig. 6;

Fig. 15 is a sectional view of the structure illustrated in Fig. 14 with the lock mechanism retracted from the position shown in Fig. 14;

Fig. 16 is a sectional view taken along the line 16—16 of Fig. 15;

Figure 17:
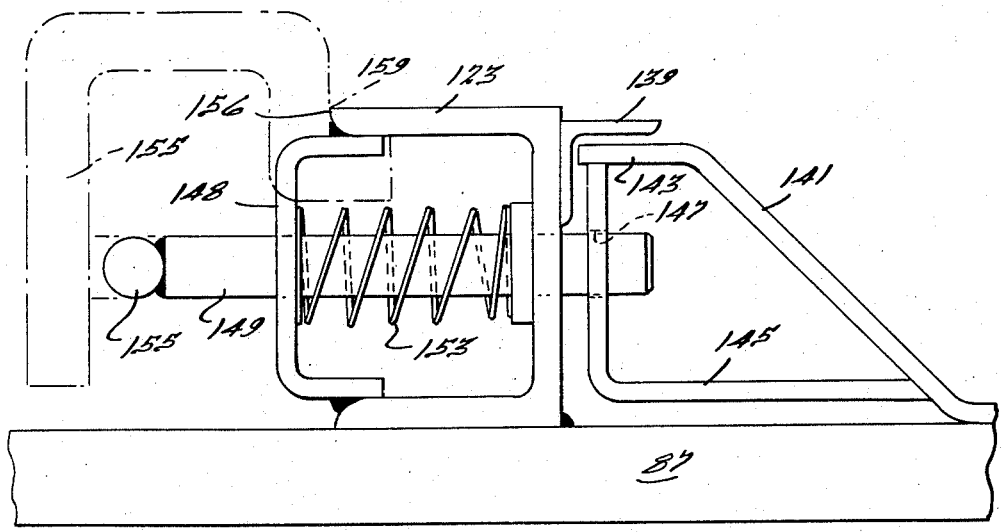
Fig. 17 is an enlarged end elevation, with the chain pan and chain rod removed, of the wheel pan latch of Fig. 4.

Referring now to the drawings, Figure 1 illustrates one end section of a conventional freight car, having a floor 45, an end wall 47, and a roof 49, all partially shown in section. The illustrated end section is equipped with the present loading frame, and it will be understood that the other end section (not shown) would normally be similarly equipped.

The present loading frame is indicated generally at 55, and is supported within the freight car by two pairs of front and rear swinging arms or rods connected adjacent to the four corners of the frame, and two pairs of front and rear legs. Fig. 1 illustrates the rods for one side of the frame, including the front rod 57 and a rear rod 59, and like supporting members are located on the opposite side of the frame. Similarly, the legs at one side of the frame are designated 71 and 73, and the other side of the frame is similarly equipped. The front rods 57 are pivotally connected to the front end of the frame as at 58, while telescopic bottom sections 77 of the rear rods 59 are pivoted to trunnion members 61 carried by an adjustable plate 63 described in my Patent No. 2,693,153. The upper ends of arms 57 are pivoted to the side walls of the car, as indicated at 52, and arms 59 are pivoted to the car roof as indicated at 51.

Each rear strut 73 is connected to the frame by means of an L-shaped connector member 75, which also connects the corresponding arm 77 to the corresponding trunnion 61. Each front strut 71 is pivotally connected to the front end of the frame 55. When not in use the struts are released from the floor and the front struts 71 are stowed in the frame and the rear struts 73 are swung upwardly and connected to the upper arms 59. A releasable connection is provided between each strut and the floor of the car, such as described in detail in Patent 2,164,661, issued July 4, 1939, to Sulo M. Nampa and assigned to the assignee hereof.

As thus far described, the present organization and its mode of operation are the same as that of various prior patents assigned to the assignee of the present invention, Butterworth Patent No. 2,079,930, granted May 11, 1937, being an example. A brief description of the general mode of operation will, therefore, be sufficient for the purposes of the present application. In the position shown, the weight of the frame 55 and the vehicle carried thereby, is borne by the front and rear pairs of struts 71 and 73, and by the front and rear supporting and adjusting arms 57 and 59. Alternatively, if desired, a part of the load may be borne by the pair of oppositely disposed elevating cables 65, which are anchored to the side frame members by anchor plates 69, and which cables are trained over sheaves 67 and 70, which are associated with a usual chain fall 70a. In accordance with more usual practice, however, chain fall 70a is partially slacked off so that the cables 65 while being relatively taut do not carry any substantial part of the load.

By releasing the legs 71 and 73 the frame may be lowered from the semidecking position shown to the loading position, in which the frame 55 rests directly upon the car floor, and from which position, after release of the usual hold-downs 27, the vehicle may be driven off of the frame 55. During this lowering movement, arms 57 and 59 swing with respect to the freight car, about their respective pivots 52 and 51, and swing with respect to the frame about the associated pivots 58 and 61. These arms, therefore, determine the path of movement through which the frame moves.

In elevating the frame to the semidecking position, an opposite but analogous action, of course, occurs, and this elevating movement is conventionally interrupted when the pivotal movement of arms 57 with respect to the frame 55 is interrupted by the engagement of these arms with frame carried hooks 169, one whereof is carried by the frame at each side thereof (Fig. 12). With the frame in this position, the struts 71 and 73 may again be placed in operative position, and the cables 65 may be slightly slacked off.

For stowage purposes and further in accordance with the aforesaid patent, the frame 55 may be elevated to a position in which it lies immediately below the roof and in a horizontal position. To permit this, the rear arms 59 are telescopic in members 77, thereby permitting the upward swinging movement of the frame 55 to be continued after arms 57 engage the hooks 169. During this continued swinging movement, arms 59 become progressively shorter and the entire assembly swings about pivots 52 as a center.

In the position shown in Fig. 1, the two telescopic sections of the rear rod 59 have reached the limit of their extensibility and hence the disposition of telescopic rods supports the rear end of the loading frame by tension. However, when the frame is elevated further into position adjacent to the roof, these two telescopic sections slide one upon the other to shorten their effective combined length. In order to support the frame 55, when in a horizontal position adjacent to the roof of the car, a pair of hook members 79 is provided.

Fig. 2 is a plan view of the automobile loading frame 55 and it includes a pair of longitudinal side rails 83 which extend the entire length of the frame. Heretofore all such automobile loading frames have had the side rail sections interrupted to receive the wheel pans, but as can clearly be seen in Fig. 2, and subsequent figures, the side rails 83 of this embodiment extend uninterruptedly throughout the entire length of the frame.

The opposite sides of the front and rear halves of the frame 55 are identical in construction and accordingly therefore only one half of the rear section and one half of the front section of the frame 55 will be described in detail with corresponding numbers being given to similar parts on the opposite side of the respective front and rear sections.

As can be seen in Fig. 3 and Fig. 4, which show a portion of the rear half of the frame 55, each side rail 83 is of a triangular box structure and the innermost leg 85 is inclined so as to guide the wheels of an automobile when loaded thereon before the wheels are engaged in the wheel pan. The outer leg 84 of the side rail is shown as being vertical and the bottom leg 86 extends horizontally between the lower ends of the inclined leg 85 and the vertical leg 84. The rear ends of the laterally opposite side rails 83 are tied together by a lateral cross beam 87 which is secured to the under side of the opposed side rails by welding or the like. Within each hollow triangular side rail 83, an L-shaped reinforcing member 89 is secured, to reinforce the outer and lower legs of the side rail 83.

The means by which the trunnions 61 are adjustably secured by way of latch 115 and apertures 97 and 99 to guide element 93 are fully described in my parent case, now Patent No. 2,693,153, and need not be repeated here since the present invention is concerned with the frame and adjustable wheel pan structures.

As seen in Figs. 2 and 4, inwardly spaced from the opposite side rails 83 on the frame 55 are a pair of channel-shaped supporting beams 123, which are secured at their outer ends on the upper surface of the flat cross beam 87. Abutting the inner edges of the top and bottom flanges of the beams 123, and secured thereto, is a laterally extending chain pan 125, the rear portion of which is positioned on top of the flat cross beam 87 and secured thereto. This chain pan 125 is of a rectangular box shape and adapted to receive for storage purposes the previously mentioned chain 27, which secures the rear axle of the vehicle to the rear end of the frame.

As can be seen in Fig. 3 secured to the under side of each side rail 83, forwardly of the rear end thereof and extending diagonally therefrom, is a bracing member 129, which passes beneath and supports the corresponding supporting beam 123, as well as the chain pan 125, and abuts against the forward edge of the cross beam 87. The chain pan 125 is provided with an opening 131 in the bottom wall thereof for allowing the diagonal brace 129 to be suitably welded thereto, and to the cross beam 87. Secured intermediate the ends of each diagonal brace 129 and extending at right angles therefrom is a second bracing member 133 which extends diagonally rearwardly from the diagonal brace 129 and is secured to the under side of the corresponding side rail 83 rearwardly of the point of securement of the diagonal brace 129.

Positioned between each side rail 83 and the adjacent longitudinal beam 123, and supported on the bracing members 129 and 133, is a wheel pan generally designated at 134. Each wheel pan 134 has a flat central portion which receives the wheels of the vehicle and adjacent its outer edge is bent upwardly to form a side wall 135 which is inclined at the same angle as the inclined inner leg 85 of the side rail. The inclined side wall 135 of the wheel pan is slidably secured to the leg 85 by means of a pair of retaining brackets 137 welded to the top of the side rail 83 and extending over the upper edge of the inclined side wall 135 to allow the wheel pan to slide relative to the side rail but not move laterally with respect thereto.

Each longitudinal supporting beam 123 has an angle member 139 welded or otherwise suitably secured to the upper end of the web portion thereof. Each wheel pan 134 has an inner inclined side wall 141, which is bent at the upper end thereof to form a horizontal flange 143 which slidably engages the member 139 to support and guide the inner end of the wheel pan during any sliding adjustment of the latter. It will be noted by referring to Fig. 4 that an L-shaped reinforcing member 145 has the upper end of its vertical leg secured to the under side of the horizontal flange 143 of the wheel pan adjacent the edge thereof. The end of the horizontal leg of the member 145 is secured to the inner surface of the inclined side wall 141 of the wheel pan, adjacent the lower end thereof. This reinforcing member 145 extends longitudinally from the front end of the wheel pan to a point beyond the center thereof and is provided with a plurality of longitudinally spaced apertures 147 therein for a reason which will be hereinafter brought out.

Figure 18:
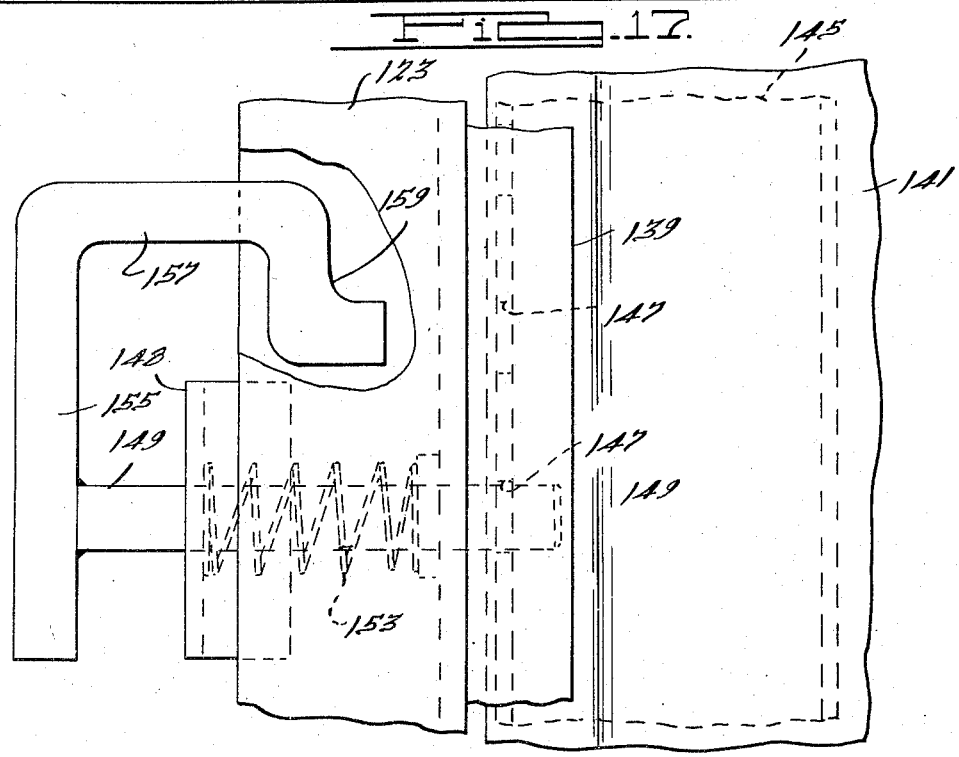
Fig. 18 is a plan view of the latch structure in Fig. 17.

As can be seen in Figs. 4, 17 and 18, a channel-shaped member 148 is secured between the inner ends of the flanges of each longitudinal channel beam 123. Each channel member 148 has an opening in the web portion thereof which receives therethrough a lock shaft 149 which extends therefrom through an aligned opening in the web portion of the longitudinal beam member 123 into one of the apertures 147 formed in the L-shaped reinforcing member 145 for the wheel pan. The lock shaft 149 has an annular collar 151 secured thereto adjacent the web portion of the beam 123 and a coil spring 153 surrounds the lock shaft 149 and its outer end abuts the collar 151 and its inner end abuts the outer surface of the web portion of the channel member 148 so as to urge the lock shaft 149 into the apertures 147. The inner end of the lock shaft 149 is provided with a handle 155 which extends on opposite sides of the lock shaft 149 at right angles thereto, and one end of which is return bent 90° to form an arm 157. The end of the arm 157 is bent rearwardly 90° and then return bent to provide a shoulder 159 which (as shown in dotted lines in Fig. 17) is adapted, when the lock shaft 149 is pulled out of engagement with the wheel pan reinforcing member 145 and rotated 90°, to engage the upper leg of the beam 123 at 156 and hold the lock shaft out of engagement with the wheel pan member 145.

In this way each wheel pan may be unlocked so as to be slidably adjusted along the frame by a single operator and when it is adjusted to the proper location the operator can turn the handle 155 so as to release the shoulder 159 from the beam member 123, and the spring will urge the lock shaft 149 through the aligned aperture 147 on the wheel pan. This type of lock allows a single operator to adjust the wheel pans.

It will be noted that a closed chain rod 161 is provided for securing each chain 127 to the frame. Each chain rod 161 extends forwardly from the rear end of the frame and has vertically depending legs 163 which pass through the flanges of the beam member 123 and are welded or otherwise secured thereto.

The plan view of one half of the front portion of the frame 55 is illustrated in Fig. 6, and details thereof are shown in Figs. 6 through 16. While only one half of the front portion of the frame will be described, it will be understood that similar numbers are to be applied to the other half of the frame as the construction thereof is identical with the half about to be described. The front end of each side rail 83 is welded to a lateral cross beam 165 which extends below the side rail 83 and across the front end of the frame. Rearwardly spaced from the cross member 165 is an arch bar 167 which extends across the frame and is welded at opposite ends to the side rails. Braces 171 interconnect the rails 83 and the arch bar 167. The center portion of the bar 167 is arched upwardly so as not to interfere with an automobile placed below the frame when the frame is in a semidecked position in the freight car. The outer end of the arch bar 167 is inclined arcuately upward to form the previously mentioned hooks 169. Thus, when the frame is in either a horizontal stowed position adjacent to the roof of the car or in the semidecking position as shown in Fig. 1, each front arm 57 will rest between the outer portion 169 of the arch bar and the corresponding side rail 83 and give additional support thereto.

Slidably positioned on the arch bar and the cross bar 165 are the front wheel pans 173, which are similar in construction to the wheel pans 134 described for the rear end. Each wheel pan 173 has an outer inclined side wall 175 which is slidably connected to the inclined front leg 85 of the side rail 83 by brackets 177 which are secured to the top of the side rail 83 and extended downwardly over the top of the inclined side wall 175 to maintain the wheel pan in a sliding relation to the side rail 83. The opposite side of each wheel pan 173 extends upwardly in an arcuate manner to form an inclined side wall 179, the upper end of which terminates in a horizontal flange 180. An L shaped reinforcing member 181 is secured to the under side of the horizontal flange 180 and to the inclined end wall 179 adjacent the lower end thereof.

Adjacent the vertical leg of the reinforcing member 181, is a vertical longitudinally extending plate 183 which has its lower edge welded to the cross members 165 and 167 and has its upper edge bent over away from the wheel pan to form flange 187. Positioned inwardly of the plate 183 is a second plate 189 the lower edge of which is similarly welded to the cross beams 165 and 167 and the upper edge of which is bent over toward the wheel pan to form flange 191, which opposes the flange 187 on the adjacent plate 183. The plates 183 and 189 are tied together by means of a horizontal plate 190 which stops short of the front ends of the members 183 and 189, but extends to the rear ends thereof, as can be seen in Figs. 6, 7, and 15.

The inner end of the horizontal flange 180 of the wheel pan extends over and is positioned on top of the flange 187 of the plate 183. An adjustable chain rod supporting member indicated at 193 is formed with a pair of oppositely disposed longitudinal grooves 195, one whereof slidably receives the flanges 180 and 187 and the other whereof slidably receives the flange 191. The chain rod itself, indicated at 197, is similar in shape to the chain rod previously described for the rear end. The forward leg 199 of the chain rod 197 depends vertically therefrom and extends through the chain rod supporting member 193 and is secured thereto by a nut 201 threaded on the lower end of the vertical leg 199. The opposite end of the chain rod has a horizontal leg 203 formed thereon which is welded to the under side of the chain rod supporting member 193 to secure the rear of the chain rod to the member 193. The lower ends of the plates 183 and 189 taper upwardly and at the rear end thereof are connected to the arch portion of the arch bar 167 by welding or the like as at 205.

The flange or shoulder 196 of the chain rod supporting member 193 which rides on the flange 191 of the plate 189, is provided with a plurality of longitudinally spaced notches 207 and the front and rear ends of the flange 196 are provided with projecting tabs 209 for use as stop means as will be hereinafter described.

Secured to the side of the plate 189 rearwardly of the front end thereof, are a pair of bearing elements 211 which support a longitudinal pin 213 which in turn pivotally supports a lock element generally indicated at 215. As can be seen in Fig. 11, the lock element 215 is of a generally Y shape and comprises an inclined handle portion 217 and an arcuate latch portion 219 adapted to be received in the notches 207 in the chain rod supporting member 193. Below the junction of the handle portion 217 and the latch portion 219 each side of the lock element 215 is stepped down as at 221. Adjacent the lower end of each stepped down portion a pair of annular hubs 223 are formed and a horizontal aperture 225 extends through the center thereof. The pin 213 is received in the opening 225 to pivotally mount the lock element 215 on the plate 189 and a coil spring 227 is looped around one of the hubs 223 with one end thereof abutting the plate 189 as at 228 and the other end thereof abutting the upper end of the cut-off portion 221. The spring is placed under compression so that it will normally urge the lock element 215 into engagement with the recesses 207 formed in the chain rod supporting member. The bottom face of the lock element which abuts the side of the plate 189 is formed with a projecting portion 229 which acts as a stop for the lock element as will be hereinafter described.

In order to allow the latch portion 219 of the lock element 215 to engage the recesses 207, the flange 191 of the plate 189 is cut out intermediate the ends thereof, as can be seen in Fig. 10, so as not to interfere with the lower end of the latch portion 219 when it swings into engagement with the recesses 207. When it is desired to adjust the chain rod for different sized vehicles which may be mounted on the loading frame 55, the lock element 215 is swung away from the chain rod supporting member against the action of the spring 227, so as to disengage the latch portion 219 from the chain rod supporting member. The lower end of the lock element 215 will move toward the plate 189 and the stop 229 will abut thereagainst to prevent any further clockwise movement of the lock element. The stop 229 is constructed so that the lock element 215 can be swung outwardly only far enough to allow the latch portion 219 to become disengaged from the recesses 207, and so that if the chain rod supporting member 193 is moved too far, the projecting tabs 209 previously described thereon will abut against the end of the latch portion 219 and prevent the chain rod supporting member 193 from sliding off the loading frame.

Secured to the vertical plate 189 and to the cross beam 165 and extending inwardly from the plate 189 is a rectangular box-shaped chain pan 230 similar in construction to the chain pan 125 previously described for the rear end of the loading frame. The front vertical wall 231 of the chain pan 230 is provided with a horizontal slot 232 extending inwardly from the plate 189. The inner end of the slot 232 terminates in a short vertical slot 233. Positioned between the vertical plates 189 and 183 is a shaft 234 which is slidably received in an aperture 235 in the member 189. Adjacent the outer end of the shaft 234 an annular collar 236 is formed, which abuts against the member 183 when in the position shown in Fig. 18. Outwardly of the collar 236 the shaft 234 passes through an aperture 237 in the member 183 and through and into one of a plurality of longitudinally spaced apertures 238 formed in the vertical leg of the reinforcing member 181 which is secured to the wheel pan 173. Surrounding the shaft 234 and having one end thereof abutting the collar 236 is a helical spring 239, the inner end of which abuts against the member 189. The inner end of the shaft 234 is provided with a handle comprising a horizontal handle portion 240 extending forwardly from the inner end of the shaft 234 and the outer end of the handle portion 240 is bent upwardly at right angles to form a vertical handle portion 241. The horizontal handle portion 240 is positioned within the horizontal slot 232 of the chain pan and the vertical portion 241 extends forwardly of the wheel pan outer wall 231 far enough to allow it to be grasped by an operator. When it is desired to adjust the wheel pan 179 with respect to the loading frame side rails, the vertical handle portion 241 is grasped by the operator and pulled inwardly thus disengaging the shaft 234 from the wheel pan reinforcing member 181. In order to lock the shaft 234 out of engagement with the wheel pan, the vertical handle portion 241 is rotated clockwise, when aligned with the vertical slot 233, and the horizontal handle portion 240 then becomes engaged in the vertical slot 233, as can be seen in Fig. 16. It can thus be seen that the shaft 234 will be held out of engagement with the wheel pan so that a single operator can then adjust the wheel pan without holding the latch out of engagement therewith. When it is desired to re-engage the shaft 234 in one of the apertures 238, the vertical handle portion 241 is rotated counterclockwise so as to move the horizontal portion out of the vertical slot and the spring 239 then moves the entire lock mechanism forwardly to engage the wheel pan once again.

While several embodiments of this invention have been illustrated and described it is to be understood that it is not to be restricted thereto, and that it is intended to cover all modifications thereof which will be apparent to one skilled in the art and which come within the spirit and scope of the appended claims.

This is a division of my copending application, Serial No. 36,551, filed July 1, 1948 now Patent 2,693,153, issued November 2, 1954.

I claim:

1. In a deck or frame for loading automobiles in freight cars or the like, the combination of a side frame member having an upwardly and outwardly inclined inner face, a wheel pan slidably mounted on the frame having an upwardly and outwardly inclined side portion contiguous to said member face, and a flange fixed on the side member and extending downwardly over the side of the pan and contiguous thereto to form a guide for sliding movement of the pan.

2. In a deck or frame for loading automobiles in freight cars or the like, a side frame member having an upwardly and outwardly inclined inner face, a wheel pan slidably mounted on the frame and side member having an upwardly and outwardly inclined side edge contiguous with the member face, the said wheel pan having its opposite longitudinal side upwardly and outwardly inclined also, a support of right-angle shape located beneath said last pan side and having its edges welded to said pan side whereby the pan side forms the hypotenuse of a right-angled cross section, and means operative on the support for removably fixing it and the pan to the frame in any of a plurality of longitudinal positions.

3. In a deck or frame for loading automobiles in freight cars or the like, a side frame member having an upwardly and outwardly inclined inner face, a wheel pan slidably mounted on the frame and side member having an upwardly and outwardly inclined side edge contiguous with the member face, the said wheel pan having its opposite longitudinal side upwardly and outwardly inclined also, and means operative on the last mentioned side of the pan for removably fixing it to the frame in any of a plurality of longitudinal positions, said means comprising a reinforcement element beneath said upwardly and outwardly inclined edge rigidly secured to the pan, a fixed frame element adjacent the reinforcement element, one of said elements having a longitudinal series of apertures therein, a movable locking member mounted in the other element adapted to fit in said apertures and key the elements together to prevent relative longitudinal movement, spring means urging the locking member toward the apertures.

4. In a deck or frame for loading automobiles in freight cars or the like, frame structure including a side frame member having an upwardly and outwardly inclined inner face, wheel pan structure including a wheel pan slidably mounted on the frame structure and side member and having an upwardly and outwardly inclined side edge contiguous with the member face, the said wheel pan having its opposite longitudinal side upwardly and outwardly inclined also, and means operative on the last mentioned side of the pan for removably fixing it to the frame structure in any of a plurality of longitudinal positions, said means comprising a reinforcement element beneath said upwardly and outwardly inclined edge rigidly secured to the pan, said frame structure including a fixed frame element adjacent the reinforcement element, one of said elements having a longitudinal series of apertures therein, a movable locking member mounted in the other element adapted to fit in said apertures and key the elements together to prevent relative longitudinal movement, spring means urging the locking member toward the apertures, a handle on the locking member for retracting it from the apertures to permit relative longitudinal movement of the pan structure and frame structure, and means for connection to the structure on which said locking member is mounted to latch the locking member in retracted position.

5. The invention as claimed in claim 4 wherein said apertures are formed in the reinforcement element and the locking member is movably mounted in the frame element and the latch means comprises an extension on the handle formed to provide a shoulder capable of abutting a frame member in a plane normal to the direction of movement of the locking member.

6. The invention as claimed in claim 4 including a latch plate mounted on said frame member and extending parallel to the direction of movement of the locking member, said latch plate having a first slot extending in the direction of such movement, and a second slot normal to such movement opening into the first slot at a point spaced from the inner end thereof, and a radial shank on the locking member between it and the handle riding in said first slot and capable upon rotation of the locking member of fitting in the second slot to abut the edge thereof and hold the member in retracted position.

7. In a deck or frame for loading automobiles in freight cars or the like, the combination of a pair of spaced upright longitudinally extending plates rigidly fixed on the frame having flanges at the top edges thereof bent inwardly toward each other, a wheel pan having a longitudinal flange resting on the inturned flange of one of said plates, a slide supported on the wheel pan flange and on the inturned flange of the other upright plate for longitudinal movement relative to the frame, a chain rod bar secured to the slide, a longitudinal series of notches formed in the edge of the slide opposite the wheel pan, and a latch member pivoted to said other upright plate engageable in said notches to longitudinally fix the position of the slide.

8. In a deck or frame for loading automobiles in freight cars or the like, the combination of a pair of spaced upright longitudinally extending plates rigidly fixed on the frame having flanges at the top edges thereof bent inwardly toward each other, a wheel pan having a longitudinal flange resting on the inturned flange of one of said plates and having a portion thereon contiguous to the vertical surface of that plate and provided with a longitudinal series of apertures, a slide supported on the wheel pan flange and on the inturned flange of the other upright plate for longitudinal movement relative to the frame, a chain rod bar secured to the slide, a longitudinal series of notches formed in the edge of the slide opposite the wheel pan, and a latch member pivoted to the upright plate engageable in said notches to longitudinally fix the position of the slide, a plunger slidably mounted in said plates and engageable with said wheel pan apertures, spring means between said plates pressing said plunger toward the wheel pan, a vertical upright plate extending transversely from the upright plate remote from the wheel pan having a first slot parallel to the axis of the plunger and a second slot opening into the first at a point spaced from the inner end of the first slot and normal to the first slot, a radial projection on the plunger slidable in said slots and engageable with the edge of the second slot to hold the plunger in retracted position, and a handle on the projection for moving the plunger.

9. In combination in a vehicle loading structure for freight cars or the like, a substantially rectangular automotive decking frame comprising side members extending uninterruptedly the length of said frame, means securing said side members in spaced relation so that a portion of an automobile may be received therebetween, each of said longitudinal side members being of a triangular hollow structure and having an inclined inner leg, means including corner pan members supported on said side members for the support of the front and rear wheels of an automobile, whereby said automobile will be guided by said inclined legs of said side members prior to being received in said corner pan members.

References Cited in the file of this patent

UNITED STATES PATENTS

| | | |
|---|---|---|
| 1,205,133 | Eide | Nov. 14, 1916 |
| 1,355,800 | Shoemaker | Oct. 12, 1920 |
| 1,606,654 | Menges | Nov. 9, 1926 |
| 1,869,060 | Harter | July 26, 1932 |
| 2,079,931 | Butterworth | May 11, 1937 |
| 2,111,191 | Nampa | Mar. 15, 1938 |
| 2,127,965 | Strid et al. | Aug. 23, 1938 |
| 2,164,662 | Nampa | July 4, 1939 |
| 2,693,153 | Nampa | Nov. 2, 1954 |